(12) United States Patent
Masuda et al.

(10) Patent No.: US 9,453,084 B2
(45) Date of Patent: Sep. 27, 2016

(54) POLYMER GEL STRUCTURE AND METHOD FOR PRODUCING THE SAME

(75) Inventors: Shoichi Masuda, Tokyo (JP); Toshihiro Suwa, Kanagawa (JP); Naoyuki Toriumi, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 739 days.

(21) Appl. No.: 12/674,596

(22) PCT Filed: Aug. 18, 2008

(86) PCT No.: PCT/US2008/073451
§ 371 (c)(1),
(2), (4) Date: Feb. 22, 2010

(87) PCT Pub. No.: WO2009/029436
PCT Pub. Date: Mar. 5, 2009

(65) Prior Publication Data
US 2011/0189420 A1 Aug. 4, 2011

(30) Foreign Application Priority Data

Aug. 27, 2007 (JP) .................................. 2007-219791

(51) Int. Cl.
*B32B 3/00* (2006.01)
*B32B 3/12* (2006.01)
*B32B 1/08* (2006.01)
*B29C 39/00* (2006.01)
*C08F 2/44* (2006.01)
*B32B 27/08* (2006.01)

(52) U.S. Cl.
CPC . *C08F 2/44* (2013.01); *B32B 1/08* (2013.01); *B32B 27/08* (2013.01); *B32B 2307/50* (2013.01); *B32B 2551/00* (2013.01); *Y10T 428/1393* (2015.01); *Y10T 428/24521* (2015.01)

(58) Field of Classification Search
CPC ......... B08F 2/44; B32B 27/30; B32B 27/08; B32B 1/08; B32B 2307/50; B32B 2551/00; G02B 3/00331; G02B 5/0278; C08J 3/075; C08L 101/14; Y10T 428/24521; Y10T 428/1393
USPC ............ 428/35.7, 420, 411.1, 35.4, 36.9, 36, 428/91, 36.4, 161
See application file for complete search history.

(56) References Cited

U.S. PATENT DOCUMENTS

| 2,900,338 | A | * | 8/1959 | Postelnck | 508/136 |
| 5,170,192 | A | | 12/1992 | Pettigrew | |
| 5,618,583 | A | * | 4/1997 | Young et al. | 427/277 |
| 5,863,650 | A | | 1/1999 | Healy et al. | |

(Continued)

FOREIGN PATENT DOCUMENTS

| JP | 04293012 | 10/1992 |
| JP | H10511307 | 11/1998 |
| JP | 2000-10054 | 1/2000 |
| JP | 2002-212452 | 7/2002 |
| JP | 2003-171686 | 6/2003 |

(Continued)

*Primary Examiner* — Yan Lan (57) ABSTRACT

A polymer gel structure that includes a first layer having at least one non-planar main surface, the first layer including a first polymer component; and a second layer formed on the main surface of the first layer, the second layer including a second polymer component, wherein the second polymer component at least partially penetrates the first layer forming an interpenetrating polymer network structure or a semi-interpenetrating polymer network structure between the first polymer component and the second polymer component.

16 Claims, 6 Drawing Sheets

(56) References Cited

U.S. PATENT DOCUMENTS

| | | |
|---|---|---|
| 6,998,007 B2 * | 2/2006 | Tukachinsky et al. .... 156/272.2 |
| 2004/0058162 A1 | 3/2004 | Tukachinsky et al. |
| 2005/0074407 A1 * | 4/2005 | Smith ............................ 424/9.5 |
| 2005/0106327 A1 | 5/2005 | Dillon |
| 2007/0128425 A1 | 6/2007 | Romdhane et al. |
| 2008/0268216 A1 * | 10/2008 | Quincy et al. ................ 428/212 |

FOREIGN PATENT DOCUMENTS

| | | |
|---|---|---|
| JP | 2006233199 | 9/2006 |
| WO | WO 96/20040 | 7/1996 |
| WO | WO 01/78971 | 10/2001 |
| WO | WO 03-093337 | 11/2003 |
| WO | WO 2006/001313 | 1/2006 |

* cited by examiner

POLYMER GEL STRUCTURE AND METHOD FOR PRODUCING THE SAME

CROSS REFERENCE TO RELATED APPLICATIONS

This application is a national stage filing under 35 U.S.C. §371 of PCT/US2008/073451, filed Aug. 18, 2008, which claims priority to Japanese Application No. 2007-219791, filed Aug. 27, 2007, the disclosure of which is incorporated by reference in its/their entirety herein.

FIELD

The present disclosure relates to polymer gel structures and methods for producing the same.

BACKGROUND

Biocompatible polymer gels having low friction coefficients (high lubricity) when immersed in a liquid (such as bodily fluid for example) are known. However, such polymer gels often have unacceptable mechanical strength. Copolymerizing a hydrophilic monomer with a proper amount of a hydrophobic monomer in order to reduce the water content, which thereby increases the mechanical strength is known, however the friction coefficient of such polymer gels can increase and the lubricity can therefore decrease.

PCT Publication No. WO03/093337 discloses a method of forming an interpenetrating polymer network structure hydrogel or a semi-interpenetrating polymer network structure hydrogel by polymerizing and crosslinking a first monomer to form a network structure, introducing a second monomer into the network structure, polymerizing the second monomer and crosslinking (if necessary) the resulting polymer. This method improves the mechanical strength but the hydrogel lacks sufficient lubricity.

Japanese Unexamined Patent Publication (Kokai) No. 2002-212452 discloses a method to form a low friction hydrogel by mixing a linear polymer and a polymer gel, or graft-polymerizing a linear polymer to a surface of a polymer gel. However such a method may decrease the lubricity because graft chains or linear polymers may be cut due to friction or abrasion.

Japanese Unexamined Patent Publication (Kokai) No. 2003-171686 discloses a method that utilizes the interaction of the polymer with water to provide a lubricant effect by making a polymer gel having a monolayer of a hydrophilic polymer gel with a non-planar surface to control the contact area. However, such a polymer gel also does not have sufficient mechanical properties.

Methods in which water soluble polymers are used as a lubricant thereby reducing the frictional resistance in water have also been used. Such a system does not maintain its lubricity because the water soluble polymer tends to migrate away from the surface or dissolves in water.

Therefore, there remains a need for a polymer gel structure that has sufficient, maintained, lubricity while still having sufficient mechanical strength.

SUMMARY

Disclosed herein is a polymer gel structure that includes a first layer having at least one non-planar main surface, the first layer including a first polymer component; and a second layer formed on the main surface of the first layer, the second layer including a second polymer component. The second polymer component at least partially penetrates the first layer forming an interpenetrating polymer network structure or a semi-interpenetrating polymer network structure between the first polymer component and the second polymer component.

Also disclosed herein are friction reducing members that include polymer gel structures as described herein.

Also disclosed herein are methods for producing polymer gel structures, the method including forming a first layer having at least one non-planar main surface and including a first polymer component; and forming a second layer on the non-planar main surface of the first layer, the second layer including a second polymer component. The second polymer component at least partially penetrates into the first layer forming an interpenetrating polymer network structure or a semi-interpenetrating polymer network structure between the first polymer component and the second polymer component.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used in this specification, the phrase "an interpenetrating polymer network structure" refers to a structure in which two or more polymers are entangled, and the entangled polymers cannot be divided without breaking a chemical bond in the network structure. An interpenetrating polymer network structure can be formed from a first polymer component (in a first layer) and a second polymer component (in a second layer), where the second polymer component has at least partially penetrated into the first polymer component before crosslinking. The phrase, "a semi-interpenetrating polymer network structure" refers to a structure in which two or more polymers are entangled, and the entangled polymers can be divided without breaking a chemical bond. The polymers in the semi-interpenetrating network structure are typically linear or branched polymers. A semi-interpenetrating polymer network structure can be formed from a crosslinked first polymer component (in a first layer) and a second polymer component (in a second layer) that has penetrated into the first layer and is polymerized without crosslinking.

As used in this specification, "crosslinking" includes both chemical crosslinking and physical crosslinking. Generally, "chemically crosslinking" and "chemical crosslinking" refers to production of a gel network structure through a chemical bond (a covalent bond). Exemplary methods of carrying out chemical crosslinking includes, but are not limited to, (1) simultaneous crosslinking and polymerization through a polycondensation reaction or a radical reaction, and (2) synthesizing a linear polymer first and then crosslinking through a chemical reaction after synthesizing. Generally, "physically crosslinking" and "physical crosslinking" refers to production of a gel network structure through a hydrogen bond, an ionic bond, a coordinate bond, a helix, or a hydrophobic bond between polymers for example.

As used in this specification, the "swelling percentage" of a gel structure can be determined by the following formula, where $W_w$ is the wet weight or the weight of a gel reaching a swelling equilibrium in a solution at 25° C.; and $D_w$ is the dry weight or the weight of the gel after drying at 80° C. for 4 hours:

Swelling (%)=$100 \times \{(W_w)-(D_w)\}/(W_w)$.

As used in this specification, the "crosslinking degree" of a polymer can be determined by the following formula, where CA is the mol concentration of the crosslinking agent; and $M^1$ is the mol concentration of the monomer:

Crosslinking degree (%)=$100 \times (CA/M^1)$

A polymer gel structure as disclosed herein includes a first layer having at least one non-planar main surface, the first layer including a first polymer component, and a second layer formed on the main surface of the first layer, the second layer including a second polymer component. The second polymer component at least partially penetrates into the first layer to form an interpenetrating polymer network structure or a semi-interpenetrating polymer network structure between the first polymer component and the second polymer component.

Methods of forming polymer gel structures are also disclosed herein. An embodiment of a method includes forming a first layer having at least one non-planar main surface, the first layer including a first polymer component; and forming a second layer on the non-planar main surface of the first layer, the second layer including a second polymer component. The second polymer component at least partially penetrates into the first layer to form an interpenetrating polymer network structure or a semi-interpenetrating polymer network structure between the first polymer component and the second polymer component.

In an embodiment, polymer gel structures disclosed herein have sufficient mechanical strength and reduced frictional properties. In an embodiment, an interpenetrating polymer network structure or a semi-interpenetrating polymer network structure that is formed between the first polymer component and the second polymer component can afford the advantage of increased mechanical strength. The at least one non-planar surface of the first layer can allow the first layer and the second layer to be alternately arranged on the surface or near a surface of the overall polymer gel structure. Such a structure can maintain low frictional resistance due to inclusion of the second polymer component. Because the first layer provides high mechanical strength, the low frictional resistance can be maintained over time.

Figure 1:
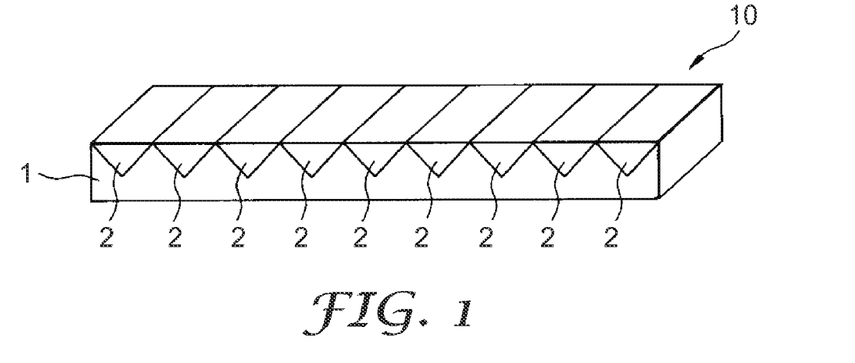
FIG. 1 is a schematic view of an embodiment of a polymer gel structure as disclosed herein.
Figure 2:
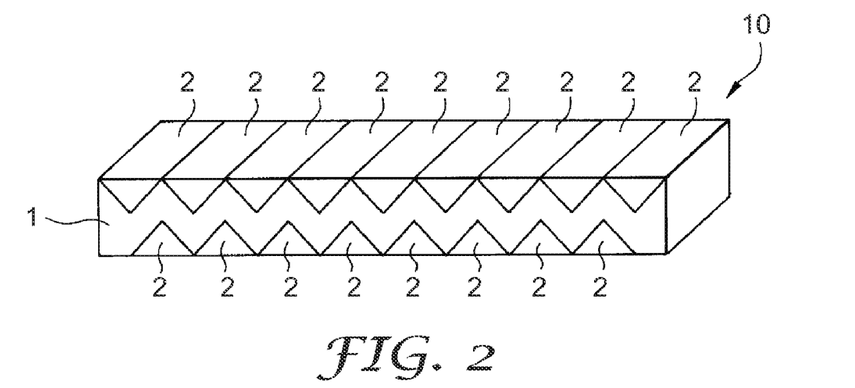
FIG. 2 is a schematic view of an embodiment of a polymer gel structure as disclosed herein.

FIGS. 1 and 2 are schematic views of an embodiment of a polymer gel structure as disclosed herein. The polymer gel structure 10 includes a first layer 1 that contains a first polymer component. In an embodiment, the first layer 1 mainly contains the first polymer component. For example, at least 60 weight percent, at least 70 weight percent, at least 80 weight percent, at least 90 weight percent, at least 95 weight percent, or at least 98 weight percent of the first layer is the first polymer component. A polymer gel structure also includes a second layer 2 that includes a second polymer component. In an embodiment, the second layer mainly contains the second polymer component. For example, at least 60 weight percent, at least 70 weight percent, at least 80 weight percent, at least 90 weight percent, at least 95 weight percent, or at least 98 weight percent of the second layer is the second polymer component.

The first layer 1 has at least one non-planar surface. In embodiments where the polymer gel structure is a film or a plate, the first layer 1 can have a non-planar main surface on one side thereof as illustrated in FIG. 1 or can have non-planar surfaces on both sides thereof as illustrated in FIG. 2. A polymer gel structure as disclosed can also be a three-dimensional structure. In embodiments where it is a three-dimensional structure, the non-planar surface can be located on at least a portion of the structure. The outermost surface of the structure typically includes the second layer 2. Although FIG. 1 and FIG. 2 both include a non-planar surface having a triangular cross section, any non-planar surface can be used. The non-planar surface can be in the form a regular repeating pattern as shown in FIG. 1 and FIG. 2 or can be non-repeating and random.

The first layer, which includes the first polymer component, may be formed by any method known to one of skill in the art. In an embodiment, the first polymer component can be formed by polymerization and chemical crosslinking. For example, a mold having a non-planar structure can be utilized. In an embodiment, the first polymer component can be formed from a polymerizable solution that can include a first monomer, which forms the first polymer component. In an embodiment, the polymerizable solution can include a monomer, a polymerization initiator and a crosslinking agent. The polymerizable solution can be applied to the mold and then be polymerized and crosslinked.

In an embodiment, the first polymer component can be formed by physical crosslinking. For example, a mold having a non-planar structure can be utilized. More specifically, the first polymer component can be applied to the mold and crosslinked through a hydrogen bond, an ionic bond, formation of a chelate, formation of a helix, or formation of a hydrophobic bond between polymers for example. Examples of polymer components capable of being formed by physical crosslinking include, but are not limited to, natural polymers such as agar or gelatin.

When a mold is utilized, the first polymer component is generally obtained as a layer that corresponds (in an opposite fashion) to the non-planar surface of the mold. A first layer having at least one non-planar surface may also be formed without using a mold. For example, a surface of a flat first polymer component can be subjected to physical processing methods. Types of physical processing that can be utilized include, but are not limited to, cutting-processes.

Polymer gel structures as disclosed herein also include a second layer that contains a second polymer component, positioned or formed on the at least one non-planar main surface of the first layer. Generally, the second polymer component covers or fills at least one non-planar surface of the first layer. The second polymer component at least partially penetrates into the first layer to form an interpenetrating polymer network structure or a semi-interpenetrating polymer network structure between the first polymer component and the second polymer component. This interpenetrating polymer network structure or semi-interpenetrating polymer network structure can be prepared by forming a second layer on the non-planar main surface of the first layer. The second layer contains the second polymer component that can at least partially penetrate into the first layer to form an interpenetrating polymer network structure or a semi-interpenetrating polymer network structure between the first polymer component and the second polymer component.

In an embodiment, the second polymer component is allowed to at least partially penetrate into the first polymer component by applying a solution (referred to as the second solution) containing the second polymer component or a precursor to the second polymer component to the first layer. Application of the second solution can be accomplished by known methods, such as by coating, by immersing the first layer in the second solution, or by a combination thereof.

In an embodiment, the second solution includes a second monomer material. In an embodiment, the second solution includes a second monomer material that forms the second polymer component, a polymerization initiator and a crosslinking agent. The first layer can be coated with the second solution. The first layer, which can be in the form of a gel, can be immersed in the second solution. Immersing the first layer into the second solution allows the monomer material of the second polymer component to permeate into the first polymer component of the first layer. The first layer can be immersed for any desired time in the second solution. The extent to which the second solution has permeated can be determined by observing the swelling extent or the swelling rate of the gel. The gel is often immersed in the second solution for several hours or more in order to reach an equilibrium swelling.

The second layer can then be formed by polymerizing and crosslinking the second monomer material. The first layer may be removed from the second solution before polymerization and crosslinking of the second monomer material. Any crosslinking method can be utilized. For example, both chemical and physical crosslinking methods can be used. In an embodiment, an ultraviolet (UV) curable resin can be used as the second monomer material and cured using UV radiation. In an embodiment, a polymerizable monomer material that is thermally polymerizable can be used as the second monomer material and the requisite amount of heat can be supplied in order to form the second polymer component. In embodiments where the permeated second polymer component is crosslinked, an interpenetrating polymer network structure can be formed. In embodiments where the second polymer component is not crosslinked after polymerizing, a semi-interpenetrating polymer network structure can be formed.

In exemplary embodiments where an interpenetrating polymer network structure is formed, the mechanical strength can be significantly improved. Whether or not an interpenetrating polymer network structure or a semi-interpenetrating polymer network structure has been formed can be confirmed by the degree of swelling of the first layer when immersed in the solution containing the second monomer or by the improvement in the mechanical strength after polymerizing the second monomer.

Figure 3:
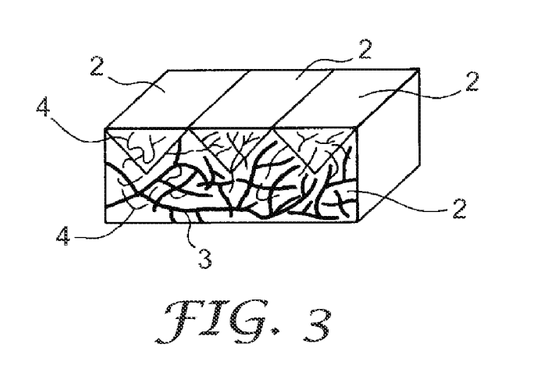
FIG. 3 is a schematic view illustrating an interpenetrating polymer network structure or a semi-interpenetrating polymer network structure of a polymer gel structure as disclosed herein.

FIG. 3 is a schematic view that illustrates an interpenetrating polymer network structure or a semi-interpenetrating polymer network structure of a polymer gel structure as disclosed herein. The first layer 1 mainly includes the first polymer component (shown as the thicker lines, 3, in FIG. 3). The second polymer component (shown as the thinner lines, 4, in FIG. 3) has penetrated into the first layer 1, and at least one polymer chain 3 from the first polymer component and at least one polymer chain 4 from the second polymer component are entangled to form a network structure. In this way, the penetrated second polymer component can improve the strength of the first polymer component. The second layer 2 including the second polymer component fills or covers at least a portion of the recessed part of the first layer. In this way, the polymer gel structure 10 has a surface that is fully covered with the second polymer component. Therefore, in embodiments where the second polymer component is a polymer having high lubricity, the frictional resistance of the overall surface can be reduced. The projected parts of the first layer can also function to reduce abrasion of the second polymer component in the recessed parts and therefore enhanced lubricity can be maintained.

The first polymer component can generally be selected so that it is capable of forming an interpenetrating polymer network structure or a semi-interpenetrating polymer network structure between the first polymer component and the second polymer component and also have the desired mechanical strength. In an embodiment, the first polymer component can be made by 1) polymerizing an unsaturated monomer that includes at least one hydrophilic group and chemically crosslinking the resulting polymer; 2) polymerizing an unsaturated monomer that includes at least one hydrophilic group and physically crosslinking the resulting polymer; 3) physically crosslinking a polymer that includes at least one hydrophilic group; 4) copolymerizing an unsaturated monomer that includes at least one hydrophilic group and an unsaturated monomer that includes at least one hydrophobic group and chemically crosslinking the resulting polymer; or 5) copolymerizing an unsaturated monomer that includes at least one hydrophilic group with an unsaturated monomer that includes at least one hydrophobic group and physically crosslinking the resulting polymer.

Exemplary unsaturated monomers that include at least one hydrophilic group include, but are not limited to, acrylic acid, methacrylic acid, 2-acrylamido-2-methylpropanesulfonic acid, acrylamide, N,N-dimethylacrylamide, N-isopropylacrylamide, 2-hydroxyethyl acrylate, 2-hydroxyethyl methacrylate, hydroxylpropyl acrylate, 2-methoxyethyl acrylate, N-vinyl pyrrolidone, vinyl acetate, butanediol monoacrylate, N,N-dimethylaminoethyl acrylate, N,N-diethylaminoethyl acrylate, 2-ethoxyethyl acrylate, 2-(dimethylamino) ethyl methacrylate, hyaluronic acid, N,N-dimethylaminoethyl ester acrylate, sodium acrylate, N-acryloylaminoethoxy ethanol, N-acryloylaminopropanol, acryloxypropane sulfonate, maleic anhydride, ethyleneimine, ethylene oxide, propylene oxide, 1,3-dioxolane, 2-methyl-1,3-dioxolane, 4-methyl-1,3-dioxolane, 2,2'-diethyl-1,3-dioxolane, dimethylaminopropylacrylamide, pyridine, vinyl methyl ether, propylene oxide and N-methylolacrylamide for example.

Exemplary unsaturated monomers that include at least one hydrophobic group include, but are not limited to, ethyl methacrylate, methyl methacrylate, 2,2,2-trifluoroethylmethyl acrylate, 2,2,3,3,3-pentafluoropropyl methacrylate, 3-(perfluorobutyl)-2-hydroxypropyl methacrylate, 1H,1H, 9H-hexafluorononyl methacrylate, 2,2,2-trifluoroethyl acrylate, 2,3,4,5,6-pentafluorostyrene and vinylidene fluoride for example.

In an embodiment, an unsaturated monomer having a hydrophilic group that produces an electric charge (e.g., an unsaturated monomer including an acid group such as (meth)acrylic acid) can be utilized to form the first polymer component to further enhance the mechanical strength of the structure. In such an embodiment, an unsaturated monomer that includes at least one hydrophobic group (e.g., alkyl (meth)acrylate such as ethyl methacrylate or the like) can be utilized as a co-monomer.

Exemplary polymers that include at least one hydrophilic group include, but are not limited to, agarose, agaropectin, amylase, gum arabic, arabinan, alginic acid, sodium alginate, propylene glycol ester alginate, insulin, ethyl cellulose, ethylhydroxyethyl cellulose, curdlan, casein, carragheenan, carboxy carboxymethyl cellulose, agar, xanthan gum, chitin, chitosan, guar gum, quince seed, glucomannan, floridian starch, yeast mannan, collagen, gelan gum, sizofuran, gelatin, cellulose, ivory nut mannan, tamarind seed gum, starch, nigeran, hydroxylethyl cellulose, hydroxylpropyl cellulose, 12-hydroxystearic acid, pusturan, funoran, decomposed xyloglucan, HM pectin, LM pectin, sodium polyacrylate, polycrylonitrile, polyamidine, polyvinyl alcohol, polyperfluorocarbonsulfonic acid, a polymethacrylic acid-polyethylene glycol copolymer, porphyran, methyl cellulose, methyl starch, lentinan and locust bean gum for example.

The second polymer component can generally be selected so that it is capable of forming an interpenetrating polymer network structure or a semi-interpenetrating polymer network structure between the first polymer component and the second polymer component. Additionally, the second polymer component can generally be selected to provide the desired surface properties for the polymer gel structure. For example, polymer gel structures that desirably have excellent lubricity in water can include a second polymer component that includes at least one hydrophilic group. In an embodiment, the second polymer component is polymerized but is not crosslinked (e.g., polymerized without using a crosslinking agent). In another embodiment, the second polymer component has a crosslinking degree that is less than the crosslinking degree of the first polymer component. In embodiments where it is especially desired to maintain the strength of the structure, the second polymer component can be crosslinked. In an embodiment, the second polymer component can be a polymer component made by polymerizing an unsaturated monomer that includes at least one hydrophilic group and chemically or physically crosslinking the polymer. In an embodiment, the second polymer component can be made by copolymerizing an unsaturated monomer that includes at least one hydrophilic group and an unsaturated monomer that includes at least one hydrophobic group and chemically or physically crosslinking the copolymer.

The exemplary unsaturated monomers that include at least one hydrophilic group and the unsaturated monomers that include at least one hydrophobic group that were discussed above with respect to the first polymer component can also be used to form the second polymer component.

Crosslinking methods known in the art can be used for chemical crosslinking the first polymer component, the second polymer component, or a combination thereof. Methods of carrying out chemical crosslinking can include (1) methods for simultaneously crosslinking while polymerizing through a polycondensation reaction or a radical reaction, and (2) methods for synthesizing a linear polymer and subsequently crosslinking through chemical reaction. In an embodiment where crosslinking is carried out simultaneous with polymerization by a radical reaction, a polyfunctional acrylic monomer or an oligomer can be added to a polymerizable monomer for crosslinking.

Polyfunctional acrylic monomers that can be utilized include but are not limited to, ethylene glycol diacrylate, ethylene glycol dimethacrylate, diethylene glycol diacrylate, diethylene glycol dimethacrylate, triethylene glycol diacrylate, triethylene glycol dimethacrylate, trimethylolpropane triacrylate, trimethylpropane trimethacrylate, allyl acrylate, allyl methacrylate, diallyl maleate, diallyl phthalate, diallyl isophthalate, triallyl isocyanate and N,N-methylenebisacrylamide for example.

In embodiments where physical crosslinking is to be utilized, known methods of physical crosslinking can be used to crosslink the first polymer component, the second polymer component, or a combination thereof. Exemplary methods include, but are not limited to, forming hydrogen bonds by a freeze-defrosting method, or a freeze-drying method; forming a polyion complex gels by mixing two kinds of a polymer electrolytic solution having opposite electric charges under proper conditions; forming a gel by mixing a highly acidic polymer and an alkali earth metal; generating a sol-gel by heating to form a gel; and forming a gel by balancing hydrophobic interactions and repulsions of ions.

Polymer gel structures as disclosed herein may also include a third polymer component. A third polymer component can, but need not, improve the mechanical strength and lubricity of the overall polymer gel structure. The third polymer component can be included in the first layer, the second layer, or at least a portion of both layers. The third polymer component can be the same as, or different than the first polymer component and/or the second polymer component. The third polymer component can be incorporated into the relevant layer or layers simultaneously with the previous steps (e.g. include the third polymer component in the solutions forming the first layer, second layer, or both). Alternatively, the third polymer component can be incorporated into the relevant layer or layers using additional steps (e.g. immersing or coating the first layer, the second layer, or both with a solution containing the third polymer component). One of skill in the art will also understand that any combination of these steps can also be utilized.

The first layer and the second layer can also optionally include various additives as would be known to one of skill in the art. For example, additives including, but not limited to, thickeners, curing agents, antioxidants, pigments, and the combination thereof can be added.

The shape and size of non-planar features of the first layer are not limited in any way, and can be chosen depending on the ultimate application of the polymer gel structure. For example, the first layer may include pyramid shapes, hemispherical shapes, hemielliptical shapes, spherical shapes, systematic shapes in which a plurality of grooves having triangular or semicircular cross sections are arranged in parallel, unsystematic irregular shapes (e.g., a surface of sandpaper) or some combination thereof.

The dimensions of the non-planar features of the first layer are generally not limited. The smaller the features of the non-planar surface, the more difficult processing can become. For example, as the volume of a single recessed portion becomes smaller, it may become more difficult to fully fill the recess with the second polymer component. The larger the features of the non-planar surface, the more likely abrasion of the second polymer component is assisted via the first layer. Recessions that may be formed in the second layer corresponding to the recessed parts of the first layer however may be advantageous to prevent smoothing of the overall structure. In an embodiment, the non-planar features can have a size of about 0.5 μm (micrometer) to about 1 cm (centimeter).

The pitch (distance from one feature to the next) of the non-planar features of the first layer are also generally not limited. In an embodiment, the non-planar features can have a pitch of about 10 μm or more. In an embodiment, the non-planar features can have a pitch of about 50 μm or more. In an embodiment the non-planar features can have a pitch of 5 mm (millimeter) or less. In an embodiment, the non-planar features can have a pitch of about 1 mm or less.

The depth of the recessed parts of the non-planar features are also generally not limited. In an embodiment, the depth of the recessed parts of the non-planar features can be from about 0.1 μm to about 7 mm. In an embodiment, the depth of the recessed parts of the non-planar features can be about 1 μm or more. In an embodiment, the depth of the recessed parts of the non-planar features can be about 10 μm or more. In an embodiment, the depth of the recessed parts of the non-planar features can be about 1 mm or less. In an embodiment, the depth of the recessed parts of the non-planar features can be about 100 μm or less.

The thickness of the second layer is not generally limited, but it is generally at least somewhat controlled by the depth of the recessed portions of the first layer.

Structures as disclosed herein can be used independently or can be combined with other materials. The structures can be used on the outer portion of any article. In an embodiment, the structures are on the outer portion of a film, sheet, or tube. A separate base material can be used with the films, sheets, or tubes. For example, when a film, a sheet, or a tube having a structure as disclosed herein is attached to the outer surface of an endoscope or a catheter (for example), the frictional resistance during insertion of the device into a patient can be reduced. This should reduce pain and discomfort felt by the patient. As another exemplary application, if a polymer gel structure as disclosed herein is applied to a contact lens, the contact lens can produce reduced discomfort when compared to a contact lens without a structure as disclosed herein. Intraocular lenses and artificial joints are other applications that could benefit from the advantages offered by structures as disclosed herein.

EXAMPLES

While the present disclosure is not so limited, an appreciation of various aspects of the disclosure will be gained through a discussion of the examples provided below.

Example 1

Preparation of a Polymer Gel Structure

Preparation of a First Polymer Component:

An aqueous UV curable monomer solution (i.e., first monomer solution or first solution) was prepared by mixing 10 g of acrylic acid (AAc, Wako Pure Chemical Corporation, Osaka, JAPAN), 20 g of distilled water, 0.4 g of NK ester A-400 (Shin-Nakamura Chemical Corporation, Fukui, JAPAN) and 0.014 g of IRGACURE 2959 (trade designation of Ciba Specialty Chemical Corporation, Basel, SWITZERLAND). NK-ester A-400 refers to a diacrylate ester of polyethylene glycol having an average molecular weight of about 400. IRGACURE 2959 refers to a photoinitiator for UV curing and is 1-[4-(2-hydroxyethoxy)-phenyl]-2-hydroxy-2-methyl-1-propane-1-one. The first solution was purged using nitrogen ($N_2$) gas and then coated on a film forming tool.

Figure 4:
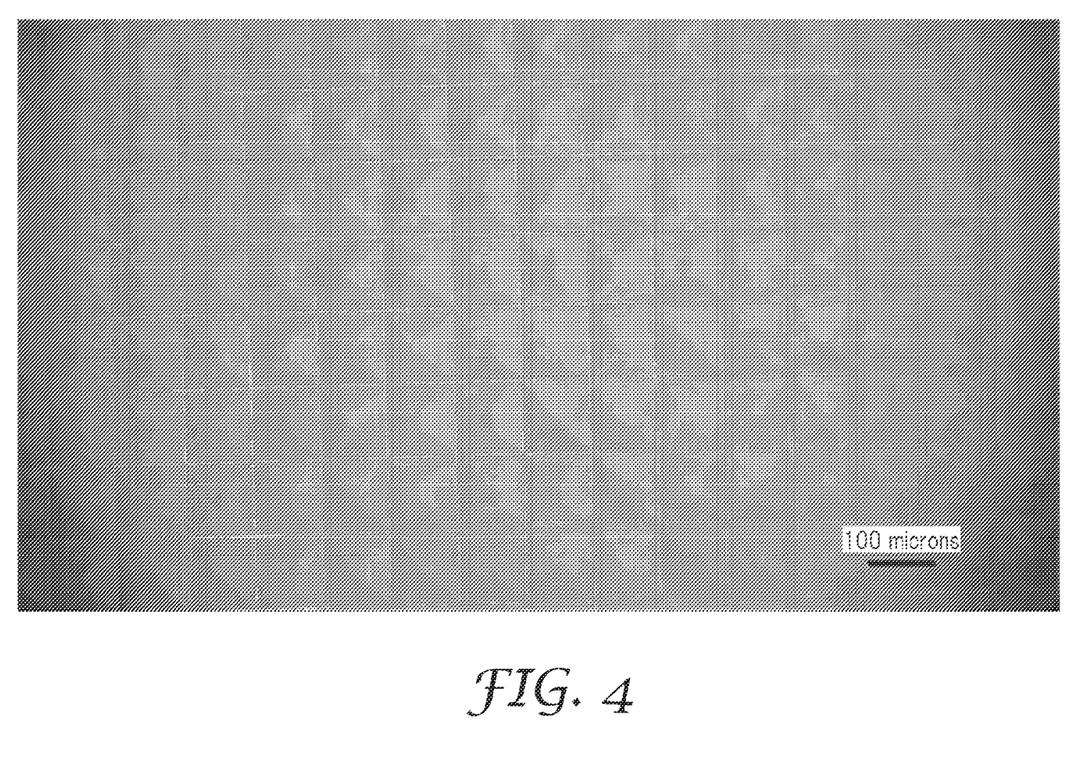
FIG. 4 is a microphotograph of a film forming tool used in the examples.

The film forming tool was a pyramid recessed mold of polypropylene. The pyramid shapes in the tool had lengths of 100 μm and depths of 63 μm. A micrographic image of the film forming tool can be seen in FIG. 4. The film forming tool was fabricated by heat pressing polypropylene pellets, which are commercially available from Japan Polypropylene Corporation under the trade designation NOVATEC-PP, against a nickel tool having the desired surface structure. The nickel tool was held at 200° C. and the pressing force was 320 kN/cm$^2$ was applied to the polypropylene. After heat pressing, the resulting polypropylene film and the nickel tool were cooled to room temperature while in contact. The polypropylene film was then removed from the nickel tool to provide the film forming tool.

The coated film forming tool (i.e., the film forming tool coated with the first monomer solution) was then laminated to a 50 μm-thick release treated polyester (PET) film. As used herein, the term "release treated" film refers to a film treated with a silicone release agent. The laminated structure, which was a combination of the film forming tool, the coating formed from the first monomer solution, and the release treated PET film, was irradiated on the PET side of the structure with UV light operating at 45,000 mJ/cm$^2$. The UV lamp was a high-pressure mercury-vapor lamp produced by USHIO Inc., Cypress, Calif., USA. The resulting first polymer component was then removed from the film forming tool to provide a first layer having a non-planar surface. The thickness of the first layer (from a top point of a projected part to the surface on a rear face) was 200 μm. The release treated PET film was removed.

Preparation of the Polymer Gel Structure:

An aqueous UV curable monomer solution (i.e., the second monomer solution or second solution) was prepared by mixing 10 g of acrylamide (AAm, Wako Pure Chemical Corporation, Osaka, JAPAN), 90 g of distilled water, 0.02 g of N-methylenebisacrylamide (MBAA, Wako Pure Chemical Corporation, Osaka, JAPAN), and 0.03 g of IRGACURE 2959 (Trade designation of Ciba Specialty Chemical Corporation, Basel, SWITZERLAND). The second solution was then purged using $N_2$ gas. The first layer prepared as above, was immersed in this second solution overnight at room temperature to allow the monomers to permeate into the first polymer component. The permeated first layer was then removed from the second solution and laminated to a release treated 50 µm PET film. The first layer permeated with the second solution was not dried prior to lamination. The PET side of the laminate was irradiated with the same UV light at 45,000 mJ/cm². The PET film was then peeled off the laminate and the resulting structure was washed by immersion in distilled water. The sample remained in distilled water forming the polymer gel structure. The term "polymer gel" refers to the interpenetrating or semi-interpenetrating polymer network structure that includes both the first polymer component and the second polymer component. The swelling percentage of this polymer gel structure in distilled water was determined to be 72%.

Example 2

Addition of Polyethylene Glycol

Preparation of First Polymer Component:
An aqueous UV curable monomer solution was prepared by mixing 1.8 g of 2-acrylamido-2-methylpropanesulfonic acid (AMPS, TOAGOSEI Corporation, Toagosei Co., Ltd., Tokyo, JAPAN), 10.8 g of distilled water, 0.088 g of N,N-methylenebisacrylamide (MBAA, Wako Pure Chemical Corporation, Osaka, JAPAN), and 0.014 g of IRGACURE 2959 (a trade designation of Ciba Specialty Chemical Corporation, Basel, SWITZERLAND). In order to increase the viscosity of the aqueous solution, 0.4 g of polyethylene glycol (PEG, average molecular weight=500,000, Wako Pure Chemical Corporation, Osaka, JAPAN) was also added. The second solution was purged using $N_2$ gas. The second solution was then coated on the film forming tool, laminated to a PET film, and UV treated as described in Example 1. The first polymer component was then removed from the film forming tool to provide a first layer having a thickness (as measured in Example 1) of 200 µm.
Preparation of Polymer Gel Structure:
A second monomer solution was prepared and used to form a polymer gel structure using the same procedure described in Example 1.

Example 3

First Polymer Component is a Copolymer

Preparation of First Polymer Component:
An aqueous UV curable monomer solution (i.e., first monomer solution or first solution) was prepared by mixing 6 g of acrylic acid (AAc, Wako Pure Chemical Corporation, Osaka, JAPAN), 3 g of 2-hydroxyethyl-2-methacrylate (HEMA, Wako Pure Chemical Corporation, Osaka, JAPAN), 20 g of distilled water, 0.4 g of NK ester A-400 (Shin-Nakamura Chemical Corporation, Fukui, JAPAN), and 0.014 g of IRGACURE 2959 (trade designation of Ciba Specialty Chemical Corporation, Basel, SWITZERLAND). The first solution was purged using $N_2$ gas. The first solution was then coated on a film forming tool, laminated to a PET film, and UV treated as described in Example 1. The first polymer component was then removed from the film forming tool to provide a first layer having a thickness (as measured in Example 1) of 200 µm.
Preparation of Polymer Gel Structure:
A second monomer solution was prepared and used to form a polymer gel structure using the same procedure described in Example 1.

Example 4

Solvent Other Than Water

Preparation of First Polymer Component:
A UV curable monomer solution (i.e., first monomer solution or first solution) was prepared by mixing 4 g of acrylic acid (AAc, Wako Pure Chemical Corporation, Osaka, JAPAN), 4 g of 2-hydroxyethyl-2-methacrylate (HEMA, Wako Pure Chemical Corporation, Osaka, JAPAN), 1 g of N,N-dimethylacrylamide (DMAAm, Wako Pure Chemical Corporation, Osaka, JAPAN), 1 g of ethymethacrylate (EMA, Wako Pure Chemical Corporation, Osaka, JAPAN), 20 g of triethylene glycol (TEG, Sigma Aldrich Corporation, St. Louis, Mo., USA), 0.8 g of trimethylolpropane triacrylate (TMPTA, Nippon Kayaku Corporation, Tokyo, JAPAN), and 0.014 g of DAROCUR 1173 (2-hydroxy-2-methyl-phenylpropan-1-one, a trade designation of Ciba Specialty Chemical Corporation, Basel, SWITZERLAND). The first solution was then purged using $N_2$ gas. The first solution was then coated on a film forming tool, laminated to a PET film and UV treated as described in Example 1. The first polymer component was then removed from the film forming tool to provide a first layer having a thickness (as measured in Example 1) of 200 µm.
Preparation of Polymer Gel Structure:
A UV curable monomer solution (i.e., second monomer solution or second solution) was prepared by mixing 10 g of N,N-dimethylacrylamide (DMAAm, Wako Pure Chemical Corporation, Osaka, JAPAN), 90 g of triethylene glycol (TEG, Sigma Aldrich Corporation, St. Louis, Mo., USA), 0.02 g of trimethylolpropane triacrylate (TMPTA, Nippon Kayaku Corporation, Tokyo, JAPAN), and 0.03 g of DAROCUR 1173 (a trade designation of Ciba Specialty Chemical Corporation, Basel, SWITZERLAND). The second solution was then purged using $N_2$ gas. The first layer, prepared as above, was then immersed in the second solution, laminated to a PET film, and irradiated as described in the second portion of Example 1. The PET film was then peeled off the laminate and the resulting structure was washed by immersion in distilled water to replace the TEG with water. The structure was allowed to swell to equilibrium.

Example 5

Increased Crosslinking Density of Second Polymer Component

Preparation of First Polymer Component
A UV curable monomer solution (i.e., first monomer solution or first solution) was prepared by mixing 4 g of acrylic acid (AAc, Wako Pure Chemical Corporation Osaka, JAPAN), 4 g of 2-hydroxyethyl-2-methacrylate (HEMA, Wako Pure Chemical Corporation Osaka, JAPAN), 1 g of N,N-dimethylacrylamide (DMAAm, Wako Pure Chemical Corporation Osaka, JAPAN), 1 g of ethymethacrylate (EMA, Wako Pure Chemical Corporation Osaka, JAPAN), 20 g of triethylene glycol (TEG, Sigma Aldrich Corporation, St. Louis, Mo., USA), 0.5 g of trimethylolpropane triacrylate (TMPTA, Nippon Kayaku Corporation, Tokyo, JAPAN), and 0.014 g of DAROCUR 1173 (a trade designation of Ciba Specialty Chemical Corporation, Basel, SWITZERLAND). The first solution was purged using $N_2$ gas. The first solution was then coated on a film forming tool, laminated to a PET film and UV treated as described in Example 1. The first polymer component was then removed from the film forming tool to form a first layer having a thickness (as measured in Example 1) of 200 µM.

Preparation of Polymer Gel Structure:

A UV curable monomer solution (i.e., second monomer solution or second solution) was prepared by mixing 10 g of acrylic acid (AAc, Wako Pure Chemical Corporation, Osaka, JAPAN), 90 g of triethylene glycol (TEG, Sigma Aldrich Corporation, St. Louis, Mo., USA), 0.8 g of trimethylolpropane triacrylate (TMPTA, Nippon Kayaku Corporation, Tokyo, JAPAN), and 0.03 g of DAROCUR 1173 (a trade designation of Ciba Specialty Chemical Corporation, Basel, SWITZERLAND). The second solution was then purged using $N_2$ gas. The first layer prepared as above was then immersed in the second solution, laminated to a PET film, and irradiated as described in the second portion of Example 1. The PET film was then peeled off the laminate and the resulting structure was washed by immersion in distilled water to replace the TEG with water and allowed to swell to equilibrium.

Example 6

Non-Planar Surface is Random Shape

Figure 5:
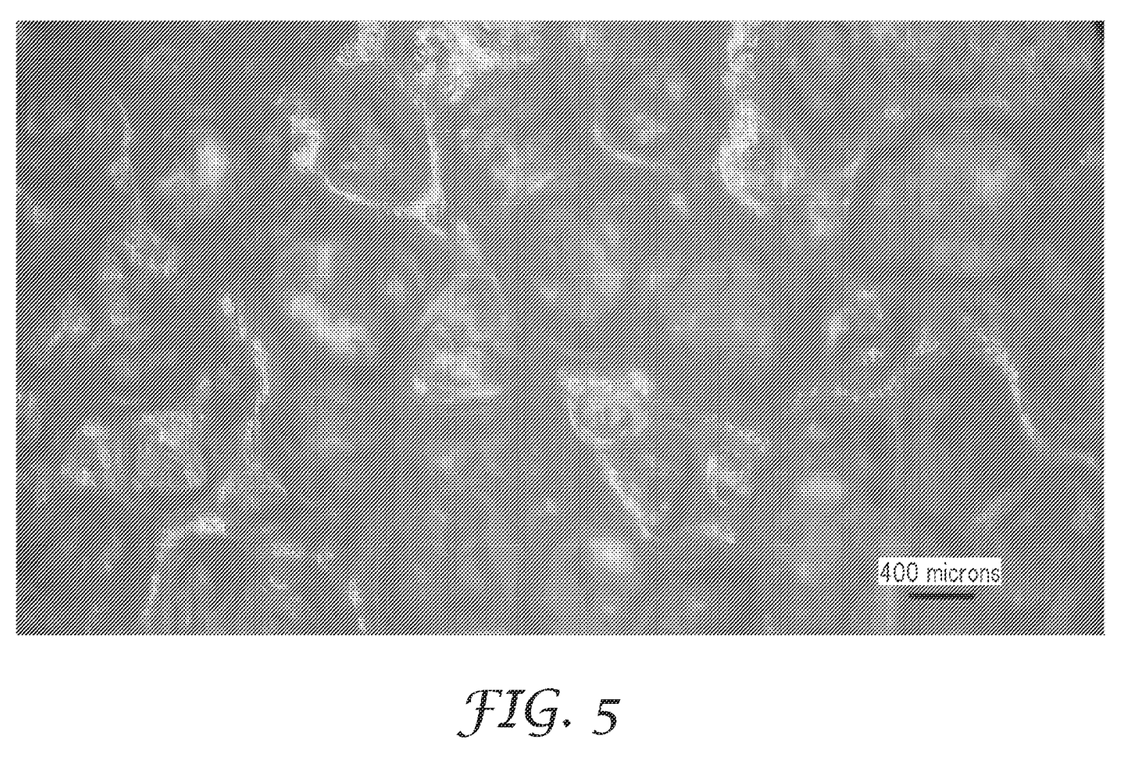
FIG. 5 is a microphotograph of another film forming tool used in the examples.

The process and materials of Example 1 were utilized except that a polypropylene film forming tool having an embossed random structural pattern was used. A micrograph of this film forming tool can be seen in FIG. 5. The film forming tool was prepared as using a process similar to that described in Example 1 except that a different nickel tool was used.

Example 7

Thermally Polymerizable First Polymer Component

Preparation of First Polymer Component

An aqueous thermally curable monomer solution (i.e., first monomer solution or first solution) was prepared by mixing 1.8 g of 2-acrylamido-2-methylpropanesulfonic acid (AMPS, TOAGOSEI Corporation, Toagosei Co., Ltd., Tokyo, JAPAN), 10.8 g of distilled water, 0.088 g of N,N-methylenebisacrylamide (MBAA, Wako Pure Chemical Corporation, Osaka, JAPAN), and 0.014 g of V-50 (2,2'-azobis(2-methylpropionamidine)dihydrochloride, Wako Pure Chemical Corporation, Osaka, JAPAN). In order to increase the viscosity of the aqueous solution, 0.4 g of polyethylene glycol (PEG, average molecular weight=500,000, Wako Pure Chemical Corporation, Osaka, JAPAN) was added and the solution was purged using $N_2$ gas. The solution was coated on the film forming tool, and laminated with a PET film as described in Example 1. The film forming tool was identical to that used in Example 1. Then, the laminate was heated for 14 hours at 56° C. in an oven to provide a first polymer component. The first polymer component was removed from the film forming tool to form a first layer having a thickness (as measured in Example 1) of 200 µm. The PET film was also removed.

Preparation of Polymer Gel Structure:

A second monomer solution was prepared and used to form a polymer gel structure as described in Example 1.

Example 8

First Polymer Component is Physically Crosslinked

Preparation of First Polymer Component

An aqueous hydrophilic polymer solution (i.e., first solution) was prepared by mixing 3 g of an agar powder (Wako Pure Chemical Corporation, Osaka, JAPAN) and 97 g of distilled water, and heating to 90° C. while stirring in a water bath in order to fully dissolve the agar powder. The first solution was coated on the film forming tool of Example 1 and cooled at 4° C. for 12 hours in a refrigerator to form a first polymer component. The first polymer component was removed from the film forming tool to form a first layer having a thickness (as measured in Example 1) of 200 µm.

Preparation of Polymer Gel Structure:

A second monomer solution was prepared and used to form a polymer gel structure as described in Example 1.

Example 9

First Polymer Component is A Thermoplastic Water-Absorbing Resin

Preparation of First Polymer Component

A first polymer component was made by coating 3 g of AQUACALK (Product Grade of TWA, Sumitomo Seika Corporation, JAPAN) on a silicone rubber film forming tool having the same shape and dimensions as the film forming tool described in Example 1. The first polymer component was then removed from the tool to form a first layer having a thickness (as measured in Example 1) of 200 µm.

The silicone rubber film forming tool used to form the first polymer component was prepared using a procedure similar to that used to prepare the polypropylene film tool in Example 1 except that the polypropylene was replaced with the silicone rubber. The silicon rubber is commercially available under the trade designation ELASTSIL M44770 from Wacker-Asahikasei Silicone Co., LTD. The silicone rubber was prepared by mixing a two-part composition that included a major component and a hardening agent. The silicone rubber was pressed against the nickel tool using a heater press (N5020-00, NPA System Corporation, Saitama, Japan), at 150° C. and 10 kN. The silicone rubber was cured on the nickel tool and then cooled while maintaining the pressure.

Preparation of Polymer Gel Structure:

A second monomer solution was prepared and used to form a polymer gel structure as described in Example 1.

Example 10

Second Polymer Component is Not Crosslinked

A first polymer component was prepared as described in Example 1. A second polymer component was prepared as described in Example 1 except that a crosslinking agent was not utilized.

TABLE 1

| Ex. No. | Layer | Monomer (g) | | | | | | | Polymer (g) | | Solvent (g) | | PEG (g) |
|---|---|---|---|---|---|---|---|---|---|---|---|---|---|
| | | AAc | AMPS | HEMA | DMAA | AAm | EMA | Agar | AQUA-CALK | | H₂O | TEG | |
| 1 | 1st | 10 | | | | | | | | | 20 | | |
|   | 2nd | | | | | | 10 | | | | 90 | | |
| 2 | 1st | | 1.8 | | | | | | | | 10.8 | | 0.4 |
|   | 2nd | | | | | 10 | | | | | 90 | | |
| 3 | 1st | 6 | | 3 | | | | | | | 20 | | |
|   | 2nd | | | | | 10 | | | | | 90 | | |
| 4 | 1st | 4 | | 4 | 1 | | 1 | | | | 20 | | |
|   | 2nd | | | | 10 | | | | | | 90 | | |
| 5 | 1st | 4 | | 4 | 1 | | 1 | | | | 20 | | |
|   | 2nd | | | | | | | | | | 90 | | |
| 6 | 1st | 10 | | | | | | | | | 20 | | |
|   | 2nd | | | | | 10 | | | | | 90 | | |
| 7 | 1st | | 1.8 | | | | | | | | 10.8 | | |
|   | 2nd | | | | | 10 | | | | | 90 | | |
| 8 | 1st | | | | | | | 3 | | | 97 | | |
|   | 2nd | | | | | 10 | | | | | 90 | | |
| 9 | 1st | | | | | | | | 3 | | | | |
|   | 2nd | | | | | | | | | | 90 | | |
| 10 | 1st | 10 | | | | | | | | | 20 | | |
|    | 2nd | | | | | 10 | | | | | 90 | | |

| Ex. No. | Layer | Crosslinking Agent (g) | | | Initiator (g) | | | Crosslinking Degree (mol %) |
|---|---|---|---|---|---|---|---|---|
| | | NS ester A-400 | TMPTA | MBAA | 2959 | 1173 | V-50 | |
| 1 | 1st | 0.4 | | | 0.014 | | | 0.567 |
|   | 2nd | | | 0.02 | 0.03 | | | 0.092 |
| 2 | 1st | | | 0.088 | | | | 6.572 |
|   | 2nd | | | 0.02 | | | | 0.092 |
| 3 | 1st | 0.4 | | | | | | 0.741 |
|   | 2nd | | | 0.02 | | | | 0.028 |
| 4 | 1st | | 0.8 | | 0.014 | | | 2.569 |
|   | 2nd | | | 0.02 | 0.03 | | | 0.067 |
| 5 | 1st | | 0.5 | | 0.014 | | | 1.606 |
|   | 2nd | | 0.8 | | 0.03 | | | 1.945 |
| 6 | 1st | 0.4 | | | | | | 5.765 |
|   | 2nd | | | 0.02 | | | | 0.092 |
| 7 | 1st | | | 0.088 | | | 0.014 | 6.572 |
|   | 2nd | | | 0.02 | | | | 0.092 |
| 8 | 1st | | | | | | | — |
|   | 2nd | | | 0.02 | | | | 0.092 |
| 9 | 1st | | | | | | | — |
|   | 2nd | | | 0.03 | | | | 0.092 |
| 10 | 1st | 0.4 | | 0.014 | | | | 0.567 |
|    | 2nd | | | 0.03 | | | | — |

NS ester A-400: polyethylene glycol diacryalte, molecular weight average = 508
1173: 2-hydroxy-2-methyl-1-phenyl-1-propanone
2959: 2-hyroxy-1-[4-(2-hy7droxyethoxy)phenyl]-2-methyl-1-propanone
V50: 2,2'-azobix(2-methylpropionamidine)dihydrochloride Comparative Examples 1 to 10

Comparative Examples 1 to 10, which did not have a second layer, were made similar to the first layers of Examples 1 to 10 except that a release treated 50 μm PET film was used instead of a film forming tool.

Comparative Example 11

An aqueous UV curable monomer solution was prepared by mixing 10 g of acrylic acid (AAc, Wako Pure Chemical Corporation, Osaka, JAPAN), 20 g of distilled water, 0.4 g of NK ester A-400 (polyethylene glycol 400 diacrylate, Shin-Nakamura Chemical Corporation, Fukui, JAPAN), and 0.014 g of IRGACURE 2959 (a trade designation of Ciba Specialty Chemical Corporation, Basel, SWITZERLAND). The aqueous solution was purged using $N_2$ gas. The aqueous solution was then inserted between two release treated 50 μm PET films, and irradiated with UV light at 45,000 mJ/cm² from one side of the film using the UV lamp described in Example 1.

A planar film, which has the same composition as the first component of Example 1, had a thickness of 200 μm. Next, the PET release films were removed from the first polymer component, and the first polymer component was immersed in distilled water overnight to swell to equilibrium.

Comparative Example 12

An aqueous UV curable monomer solution was prepared by mixing 10 g of acrylamide (AAm, Wako Pure Chemical Corporation, Osaka, JAPAN), 90 g of distilled water, 0.02 g of N,N-methylenebisacrylamide (MBAA, Wako Pure Chemical Corporation, Osaka, JAPAN), and 0.03 g of DAROCUR 1173 (a trade designation of Ciba Specialty Chemical Corporation, Basel, SWITZERLAND). The aqueous solution was then purged using $N_2$ gas. The aqueous solution was inserted between two release treated 50 μm PET films, and was irradiated from one side of the film with UV light at 45,000 $mJ/cm^2$ using the UV lamp described in Example 1.

Then, a planar film, which had the same composition as the second polymer component of Example 1, had a thickness of 200 μm. Next, the PET release films were removed from the second polymer component, and the second polymer component was immersed in distilled water overnight to swell to equilibrium.

Analysis Methods

Figure 6:
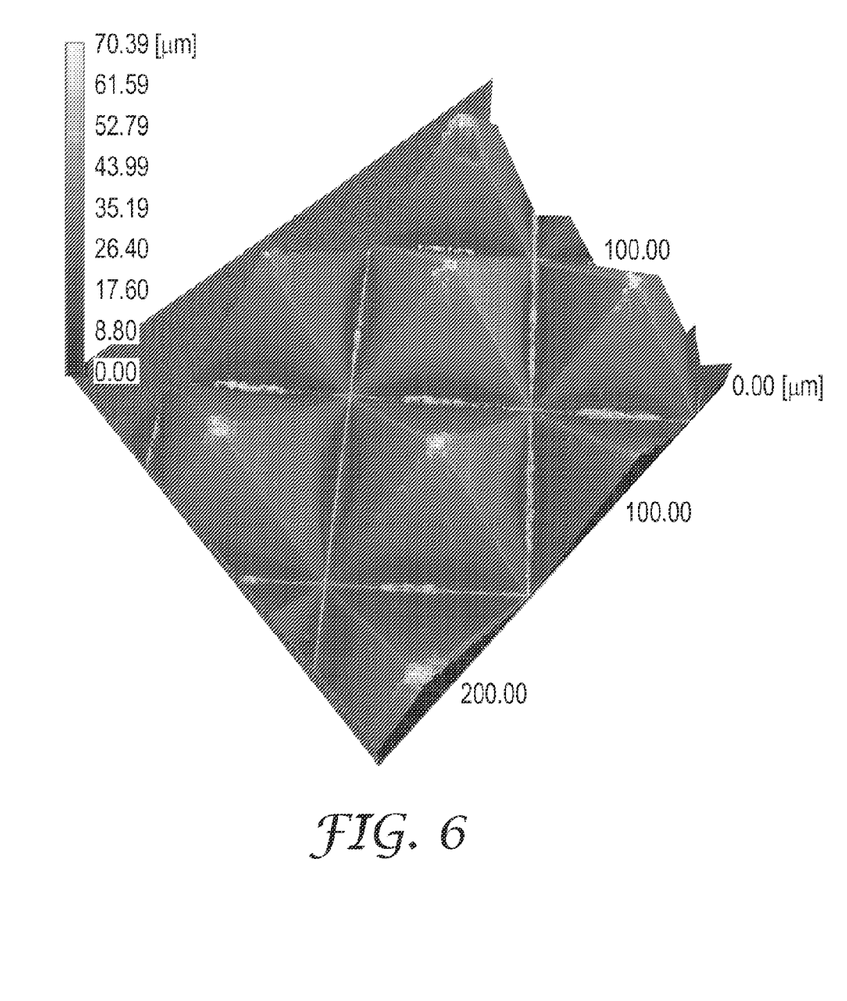
FIG. 6 is a laser microphotograph showing the surface of the first layer produced in Example 1.
Figure 7:
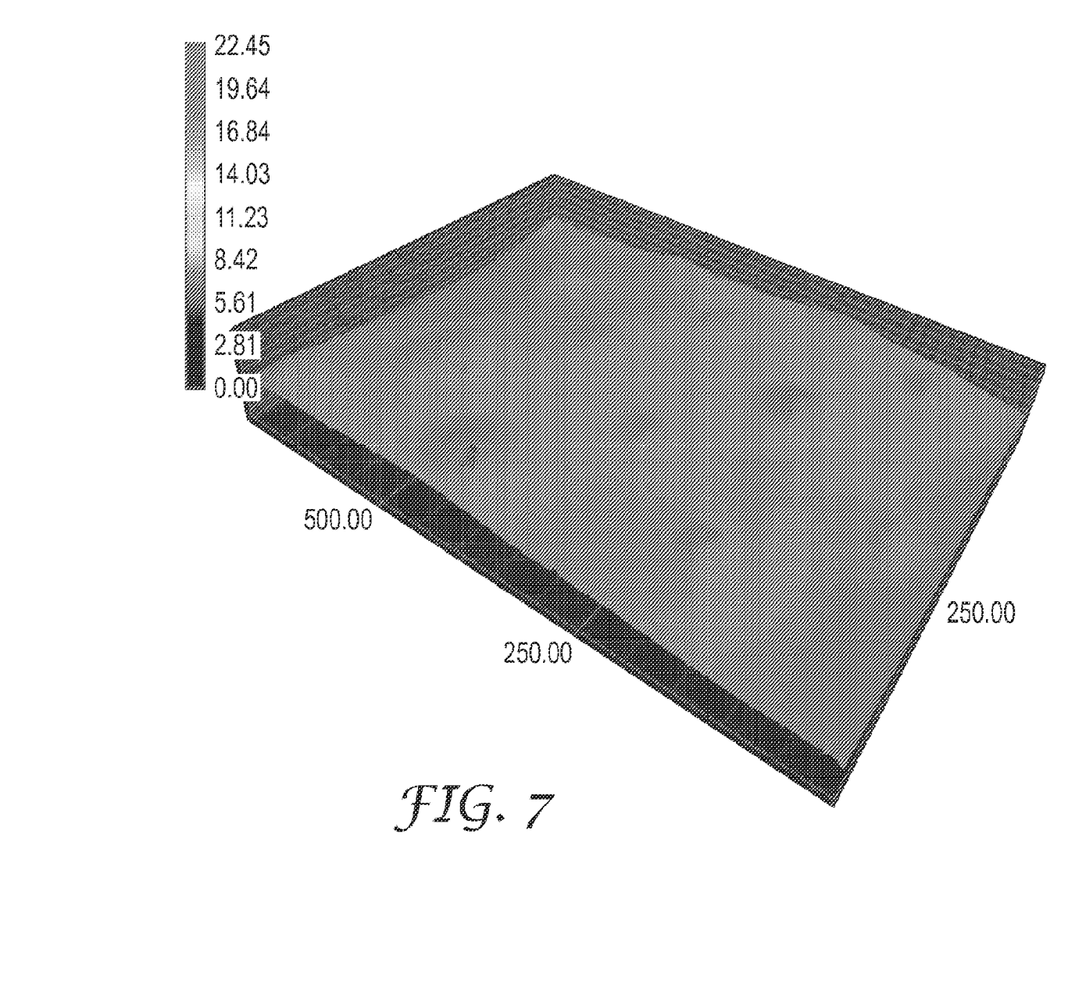
FIG. 7 is a laser microphotograph showing the surface of the polymer gel structure produced in Example 1.

The surface of the first layer formed in Example 1 was photographed using a laser microscope (VK-9500GII produced by KEYENCE Corporation, Osaka, JAPAN). A microphotograph at a magnification of 100 is shown in FIG. 6. The surface of the second polymer component from Example 1 was also photographed using the same laser microscope. A microphotograph at a magnification of 100 is shown in FIG. 7. As seen in FIGS. 6 and 7, the second layer of the second polymer component filled in the recessed parts of the surface of the first layer.

The structures prepared in Examples 1 to 10 and Comparative Examples 1 to 10 were finger rubbed in distilled water to test the lubricity of the structures in water. The lubricity was evaluated and determined to be excellent (too lubricous to grasp with fingers), good (lubricous but able to be grasped with fingers), poor (not very lubricous and easily grasped with fingers) and inferior (not lubricous at all).

TABLE 2

| Example Number | Lubricity | Comparative Example No. | Lubricity |
|---|---|---|---|
| 1 | Excellent | 1 | Poor |
| 2 | Excellent | 2 | Poor |
| 3 | Excellent | 3 | Poor |
| 4 | Excellent | 4 | Poor |
| 5 | Good | 5 | Inferior |
| 6 | Excellent | 6 | Poor |
| 7 | Excellent | 7 | Poor |
| 8 | Excellent | 8 | Poor |
| 9 | Excellent | 9 | Poor |
| 10 | Excellent | 10 | Poor |

Figure 8:
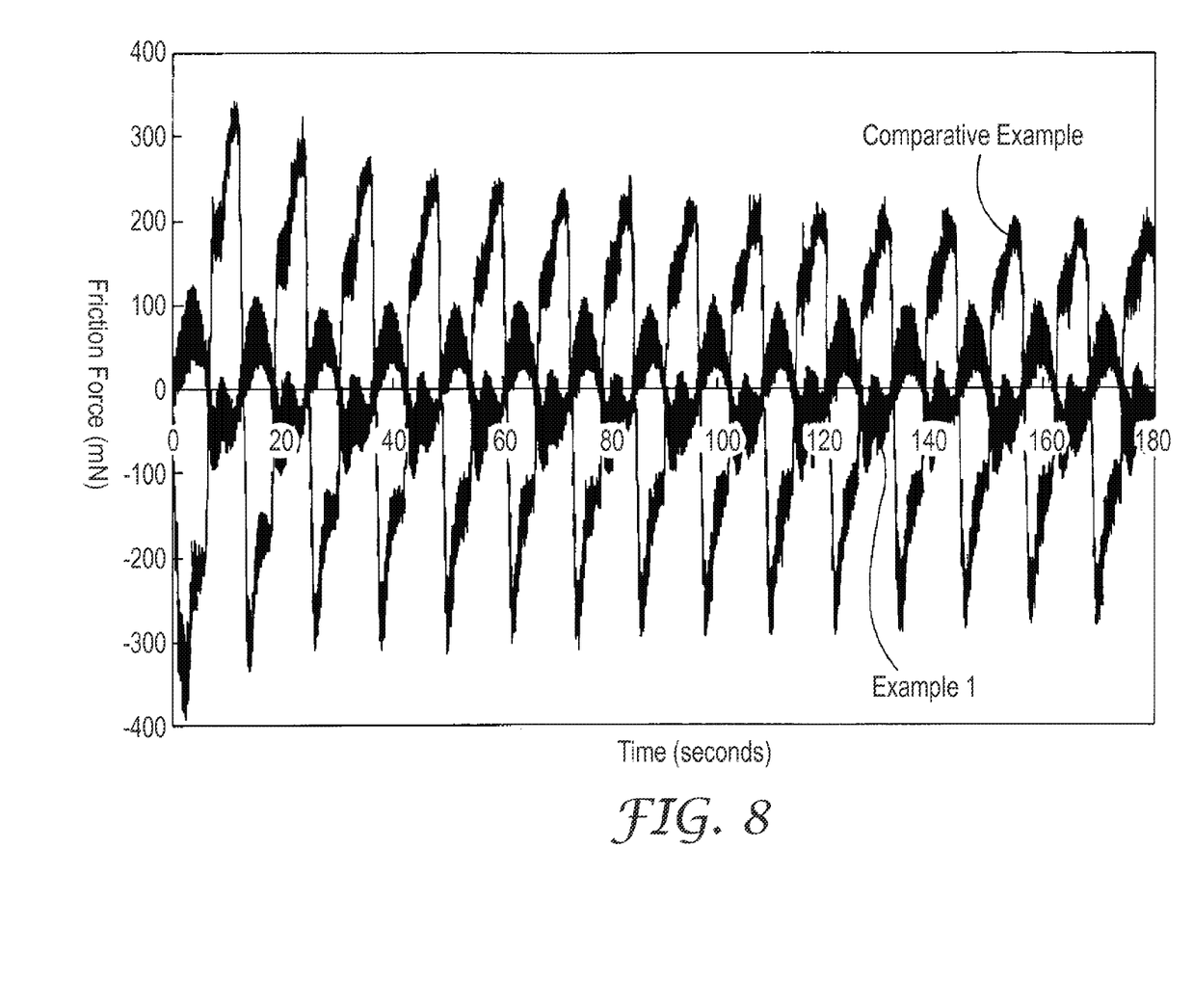
FIG. 8 is a graph of frictional forces measured from the structures of Example 2 and Comparative Example 2.

Friction generated from movement back and forth across the surfaces of the structures prepared in Example 2 and Comparative Example 2 were measured using Friction Player FPR-2100 from Rhesca Co., LTD, Tokyo, Japan. The measurement was carried out in a straight line reciprocative movement mode at room temperature (25° C.). The structures were cut to form 5 cm×5 cm samples and fixed in a measuring stand in ion exchanged water. A slipping rate was 100 mm/minute, load weight was 100 g weight, and the friction material was a jig made of steel (SUJ-2) having an area of 45 $mm^2$. The results of the measurements are shown in FIG. 8. As seen in FIG. 8, the frictional force of Example 2 was about one half or one third that of Comparative Example 2.

The polymerized structure of Example 1 and Comparative Examples 10 and 11 were swelled to equilibrium in water. Samples of the swelled structures were cut to 5 cm×5 cm and fixed to a flat measuring stand. A load of 1,000 $g/cm^2$ was applied to the center part of the gel structure for 20 seconds (at 25° C.) with a probe having a top end surface of about 5 $mm^2$. The structures were broken by the load and the pressure necessary to break the structures were noted. The results are shown in Table 3.

TABLE 3

| Example Number | Breaking pressure ($g/cm^2$) |
|---|---|
| 1 | $>10^3$ |
| Comparative Example 10 | $<10^3$ |
| Comparative Example 11 | $<10^3$ |

Thus, embodiments of polymer gel structures and methods of making the same are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

We claim:

1. A polymer gel structure comprising:
   a first polymer gel layer having at least one non-planar main surface, the first polymer gel layer comprising a first polymer component having at least one hydrophilic group and a second polymer component having a hydrophilic group, wherein the first polymer component is a gel and is different than the second polymer component and wherein the second polymer component forms an interpenetrating network structure or a semi-interpenetrating polymer network structure with the first polymer component; and
   a second polymer gel layer formed on the non-planar main surface of the first polymer gel layer, the second polymer gel layer being different than the first polymer gel layer wherein an outer surface of the polymer gel structure comprises the second polymer gel layer and wherein the second polymer gel layer consists of the second polymer component.

2. The polymer gel structure according to claim 1, wherein the first polymer component is made by polymerizing an unsaturated monomer having at least one hydrophilic group and chemically crosslinking the resulting polymer.

3. The polymer gel structure according to claim 1, wherein the first polymer component is made by copolymerizing an unsaturated monomer having at least one hydrophilic group and an unsaturated monomer having at least one hydrophobic group and chemically or physically crosslinking the resulting copolymer.

4. The polymer gel structure according to claim 1, wherein the first polymer component is made by chemically or physically crosslinking a polymer having at least one hydrophilic group.

5. The polymer gel structure according to claim 1, wherein the second polymer component is made by chemically or physically crosslinking a polymer having at least one hydrophilic group.

6. The polymer gel structure according to claim 1, wherein the second polymer component is made by polymerizing an unsaturated monomer having at least one hydrophilic group.

7. The polymer gel structure according to claim 1, wherein the second polymer component is made by polymerizing an unsaturated monomer having at least one hydrophilic group, and chemically or physically crosslinking the resulting polymer.

8. The polymer gel structure according to claim 1, wherein the second polymer component is made by copolymerizing an unsaturated monomer having at least one hydrophilic group and an unsaturated monomer having at least one hydrophobic group.

9. The polymer gel structure according to claim 1, wherein the second polymer component is made by copolymerizing an unsaturated monomer having at least one hydrophilic group and an unsaturated monomer having at least one hydrophobic group, and chemically or physically crosslinking the resulting polymer.

10. The polymer gel structure according to claim 1, wherein the second polymer component is lubricous.

11. The polymer gel structure according to claim 1, wherein the first polymer component is crosslinked and the second polymer component is lubricous.

12. A friction reducing member comprising the polymer gel structure according to claim 1.

13. The friction reducing member according to claim 12, wherein the member is in the form of a sheet, a film or a tube.

14. A method for producing a polymer gel structure, the method comprising:

providing a first polymer gel layer having at least one non-planar main surface, the first polymer gel layer comprising a first polymer component having at least one hydrophilic group and a second polymer component having a hydrophilic group, wherein the first polymer component is a gel and is different than the second polymer component and wherein the second polymer component forms an interpenetrating network structure or a semi-interpenetrating polymer network structure with the first polymer component; and providing a second polymer gel layer on the non-planar main surface of the first polymer gel layer, the second polymer gel layer being different than the first polymer gel layer and comprising the second polymer component, wherein an outer surface of the polymer gel structure comprises the second polymer gel layer and wherein the second polymer gel layer consists of the second polymer component.

15. The method according to claim 14, wherein the method comprises providing the first polymer gel layer comprises providing the first polymer component and forming the second polymer component in the presence of the first polymer component.

16. The method according to claim 14, wherein the first polymer component is crosslinked and the second polymer component is lubricious.

* * * * *

UNITED STATES PATENT AND TRADEMARK OFFICE
CERTIFICATE OF CORRECTION

| | |
|---|---|
| PATENT NO. | : 9,453,084 B2 |
| APPLICATION NO. | : 12/674596 |
| DATED | : September 27, 2016 |
| INVENTOR(S) | : Shoichi Masuda, Toshihiro Suwa and Naoyuki Toriumi |

It is certified that error appears in the above-identified patent and that said Letters Patent is hereby corrected as shown below:

In the Specification

Column 7,
Lines 45-46, "carragheenan," should read --carrageenan,--.
Line 49, "gelan" should read --gellan--.
Lines 49-50, "sizofuran," should read --sizofiran,--.
Line 52, "pusturan," should read --pustulan,--.
Line 54, "polycrylonitrile," should read --polyacrylonitrile,--.

Column 12,
Line 22, "ethymethacrylate" should read --ethyl methacrylate--.
Line 65, "ethymethacrylate" should read --ethyl methacrylate--.

Column 13,
Line 10, "μM." should read --μm.--.

Column 15,
Line 46, "diacryalte," should read --diacrylate,--.
Line 48, "hyroxy-1-[4-(2-hy7droxyethoxy)phenyl]-2-methyl-1-pronanone"
should read --hydroxy-1-[4-(2-hydroxyethoxy)phenyl]-2-methyl-1-propanone--.

In the Claims

Column 20,
Claim 16, Line 24, "lubricious." should read --lubricous.--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*